United States Patent
Wojcik

(10) Patent No.: US 6,820,953 B2
(45) Date of Patent: Nov. 23, 2004

(54) MEMORY STORAGE DEVICE CARRIER HAVING A LOCKING HANDLE

(76) Inventor: Frank Wojcik, 2825 Glen Decker Ct., San Jose, CA (US) 95148

( * ) Notice: Subject to any disclaimer, the term of this patent is extended or adjusted under 35 U.S.C. 154(b) by 29 days.

(21) Appl. No.: 10/105,116

(22) Filed: Mar. 22, 2002

(65) Prior Publication Data

US 2003/0178921 A1 Sep. 25, 2003

(51) Int. Cl.[7] ............................................. A47B 95/02
(52) U.S. Cl. .................................................. 312/332.1
(58) Field of Search ........................... 312/330.1, 332.1, 312/348.6, 223.1, 223.2, 244; 16/405, 408, 409, 415, 438; 190/115, 18 A; 361/683, 684

(56) References Cited

U.S. PATENT DOCUMENTS

| | | | | |
|---|---|---|---|---|
| 2,514,246 A | * | 7/1950 | Knox | 361/727 |
| 3,011,851 A | * | 12/1961 | Verga et al. | 312/332.1 |
| 3,120,412 A | * | 2/1964 | Caldwell | 312/332.1 |
| 3,140,905 A | * | 7/1964 | Trotter et al. | 312/332.1 |
| 3,228,740 A | * | 1/1966 | Lundell | 312/332.1 |
| 3,313,586 A | * | 4/1967 | McClintock | 312/332.1 |
| 4,366,595 A | * | 1/1983 | Elliott | 16/71 |
| 5,208,942 A | * | 5/1993 | Simon | 16/429 |
| 5,765,933 A | * | 6/1998 | Paul et al. | 312/332.1 |
| 5,797,667 A | * | 8/1998 | Wu | 312/332.1 |
| 5,947,572 A | * | 9/1999 | Chang | 312/332.1 |
| 6,193,033 B1 | * | 2/2001 | Sadow et al. | 190/18 A |
| 6,231,144 B1 | * | 5/2001 | Chen et al. | 312/332.1 |
| 6,231,145 B1 | * | 5/2001 | Liu | 312/332.1 |

FOREIGN PATENT DOCUMENTS

DE          1282756     * 11/1968

* cited by examiner

Primary Examiner—James O. Hansen
(74) Attorney, Agent, or Firm—Townsend and Townsend and Crew LLP

(57) ABSTRACT

A memory storage device carrier 10 includes a face 16 and a handle 18 attached to the carrier 10. The handle 18 moves from a first position, where the handle 18 lies flush with the face 16 to a second position where the handle 18 extends from the face 16. A lock 22 mounts between the handle 18 and the carrier 10 to selectively lock the handle 18 in the first position. The lock 22 includes a housing, a spring and a lock surface 24. The lock 22 housing has a threaded exterior and a hollow interior. The spring mounts within the interior of the housing to bias the lock surface 24 against the handle. The threaded exterior of the lock 22 housing enables the depth of the threaded engagement of the lock 22 in the carrier to be adjustable. Adjustment of this depth is achieved by rotating the housing and such adjustment ultimately regulates the amount of force required to unlock the handle in either of the first and second positions, respectively.

5 Claims, 1 Drawing Sheet

MEMORY STORAGE DEVICE CARRIER HAVING A LOCKING HANDLE

BACKGROUND

Memory storage device carriers are used for inserting and removing hard disk drives from memory storage systems. One carrier is described in U.S. Pat. No. 6,193,339 to Behl et al, the disclosure of which is incorporated herein by reference. This carrier has a cantilever locking system that is effective for locking the carrier in a rack.

Carriers protect hard drives, for example, from impact during handling. Many are equipped with handles to enable an operator to grasp the carrier without dropping it.

During operation of a memory storage system, carriers enclosing hard disk drives may vibrate and the handles may wobble. A wobbling handle may be particularly displeasing when the carrier and handle are made of metal (e.g. aluminum or steel) and the handle noisily rattles against the face of the metal carrier.

SUMMARY OF THE INVENTION

A memory storage device carrier having a locking handle includes rails and a face attached to the rails. The rails enable the carrier to slide into a memory storage device rack. The face facilitates ventilation, includes a switch for locking the carrier in the rack, various function indicators in communication with the memory storage device (e.g. hard disk drive), and a handle.

The handle attaches to the carrier. The handle moves from a first position, where the handle lies flush with the face to a second position where the handle extends from the face. Extending the handle from the face enables a user to grasp the handle and safely transport the carrier with the memory storage device.

A lock mounts between the handle and the face to selectively lock the handle in the first position. Releasing the lock allows the handle to glide between the first position into the second position.

The lock includes a housing, a resilient member and a lock surface. The housing has a threaded exterior and a hollow interior. Preferably the resilient member includes a spring, which mounts within the interior of the housing to bias the lock surface against the handle. Preferably, the face of the carrier, or a region of the carrier proximal the face, has threaded holes defined laterally with respect to the face and the lock housing threads into these laterally defined holes.

It can be appreciated, however, that the present invention can also function when the handle has laterally defined threaded holes at the ends of the handle for receiving the lock housing threads. In this way the lock housing mounts in the handle ends and the lock surface contacts the face (e.g. on lateral sides of the face) when the handle is fixed, or moves between the first and second positions.

Rotating the threaded housing into the threaded holes on the face of the carrier adjustably distances the lock surface with respect to the handle. The threaded housing enables one to adjustably bias the force of the lock surface against the handle. Preferably, the handle has two ends and the lock surfaces slide along the ends when the handle rotates and the lock surfaces lock against the ends of the handle when the handle occupies either the first or second position, respectively.

An alternative embodiment includes a biasing mechanism, such as an adjustably tensionable spring. According to this embodiment, adjusting the tension of the spring enables the lock surface to press against the handle with a desired level of variable tension without necessarily requiring movement of the housing. In this embodiment the distance between the lock housing and the handle need not change. Also, the housing can be fixed with respect to the handle. For example, according to an alternate embodiment, the housing can be press-fit or integrated in the housing so that threads are not required.

The handle includes two ends rotatably attached to the face of the carrier. The ends of the handle each include a lock plate with discrete recesses. The handle rotates between the first position, where at least one of the discrete recesses engages the lock to hold the handle, and the second position. In the second position, another of the discrete recesses engages the lock to hold the handle.

DETAILED DESCRIPTION

Figure 1:
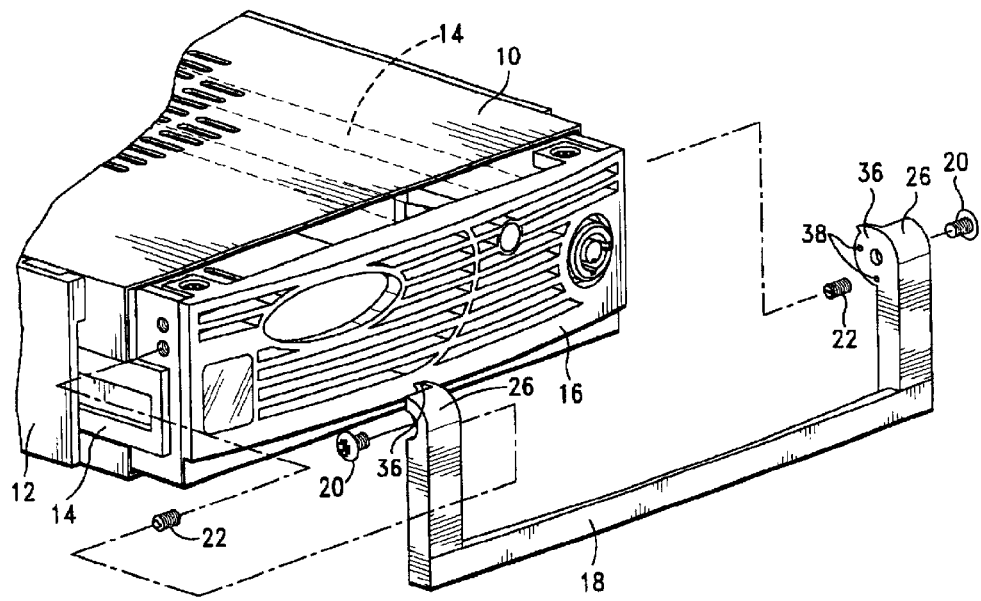
FIG. 1 is an exploded perspective view of the carrier.

FIG. 1 is a carrier 10 mounted in a rack 12. The carrier 10 includes rails 14 that slide with respect to the rack to align and hold the carrier 10 in the rack. The rails 14 are defined on opposing lateral sides of the carrier 10.

The carrier 10 has a face 16 attached to the carrier, rails 14 and a handle 18. According to one aspect of the invention, the handle attaches to the carrier proximal the face. According to an aspect of the invention, the handle attaches to the face 16. As defined herein, the face 16 is to be broadly construed as to include the region of the carrier 10 that is visible when the carrier mounts in an operative position within the rack. The face 16 can also wrap around lateral sides of the carrier and need not be fully visible. In some instances, the face 16 may be covered. The handle 18 moves from a first position, where the handle 18 lies generally flush with the face 16 to a second position where the handle 18 extends from the face 16 to enable a user to grasp the handle 18 to carry the carrier 10, or to remove the carrier 10 from the rack 12. Screws 20, or any other fasteners, rotatably hold the handle 18 with respect to the face 16 and provide the handle 18 with a center for rotation.

The handle 18 has two ends 26 sharing a common axis of rotation. The carrier 10 includes a lock 22 for each end 26. The two ends 26 each include a lock plate 36 with discrete recesses 38. The handle 18 is rotatable between the first position where a lock 22 engages at least one of the discrete recesses 38 to lock the handle 18 and a second position where at least one other discrete recess 38 and a lock 22 engage. The lock 22 and the recesses 38 at each end 26 of the handle cooperate to selectively lock the handle 18 in either the first position or in the second position.

The locks 22 adjustably mount in the carrier 10, being interposed between the region of the carrier 10 proximal the face 16 and the ends 26 of the handle 18. In an alternate embodiment, the locks 22 mount on the face 16. The lock 22 is positioned near the axis of rotation on the carrier 10. The lock 22 threads into the carrier 10, or lateral side of the face 16, so that rotation of each lock 22 achieves an adjustable depth. An adjustable depth adjustably biases the lock 22 against the handle 18.

Figure 2:
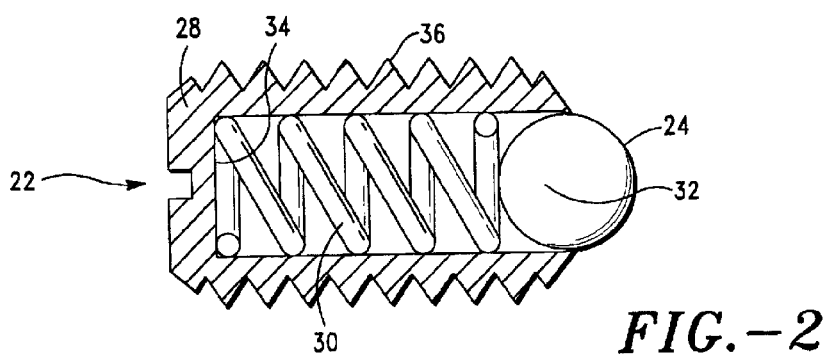
FIG. 2 is a cross-sectional side view of a lock having a true spherical shape in accordance with the present invention.

FIG. 2 shows the lock 22 including a housing 28, a spring 30 and a ball 32. The housing 28 retains the ball 32, and a portion of the ball 32 protrudes from the housing 28. This protruding portion is termed the lock surface 24. The spring 30 is a helical spring that mounts within the housing 28 to bias the lock surface 24 of the ball against the handle 18. The ball 32 has a spherical shape.

The spring 30 includes a coil spring. The housing 28 fully encloses the spring 30. The spring 30 has two ends and one end engages the housing interior 34 and the other end presses against the ball 32. The housing 28 has an exterior with external threads 36.

It can be appreciated that the spring 30, according to various aspects of the invention, is a resilient member including a solid rubber piece, and need not always assume the form of a coiled or bent spring.

Figure 3:
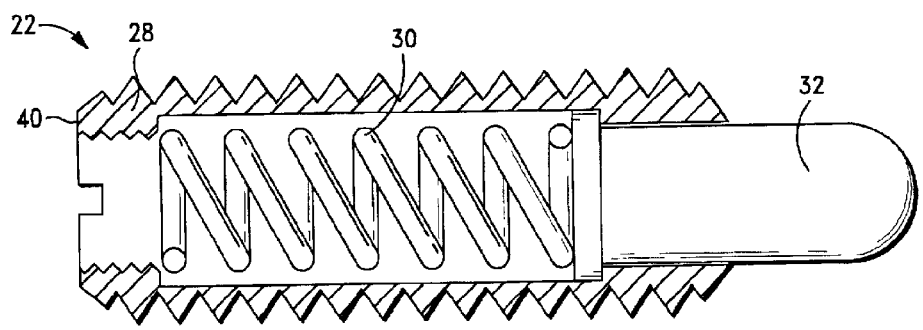
FIG. 3 is a cross-sectional side view of a lock having an elongated spherical shape in accordance with the present invention.

FIG. 3 shows the lock 22 with a ball 32 having an elongated spherical shape. According to various aspects of the invention, the ball 32 can be replaced with a curved surface such as a hemispherical shell, or a flat spring with a curved contour. One end 40 of the housing 28 has internal threads for optionally receiving a threaded cap. Receipt of a threaded cap compresses the spring 30 to adjustably press against the ball 32.

A method of locking the handle 18 of a memory storage device carrier 10 in accordance with the present invention includes selectively locking the handle 18 in the first position to inhibit the handle 18 from rattling against the face 16 during operation of the memory storage device and selectively locking the handle 18 in the second position to enable one to grasp the handle 18 and safely transport or store the memory storage device and carrier 10.

The step of locking includes adjustably biasing a ball 32, or other discrete lock surface 24, against the handle 18 to lock the handle 18. Accordingly, when the lock surface 24 has threaded housing 28 and a spring 30, the step of locking includes rotating the threaded housing 28 to adjustably bias the ball 32 against the handle 18 when the handle 18 locks in the first position and/or the second position, respectively.

Although the present invention is described in terms of preferred embodiments, these are intended to be exemplary only and are not intended to limit the scope of the present invention. For example, the location and orientation of the lock 22, with respect to the carrier 10 could be designed in numerous manners. Velcro, a magnet, a latch, or a pawl for retaining the handle could replace the lock 22. Also, the orientation of the handle 18 and the shape of the handle 18 may change. The handle 18 may have multiple additional functions, and need not necessarily be used for carrying the carrier 10.

What is claimed is:

1. A memory storage device carrier having a locking handle, comprising:
   a handle attached to the carrier, the handle being movable from a first position to a second position where the handle extends from the carrier and
   a lock mounts between the handle and the carrier to selectively lock the handle in the first position;
   wherein the lock includes a housing, a spring and a lock surface, the spring mounts within the housing to bias the lock surface against the handle, the housing is threaded to mate with the carrier and the housing rotates with respect the carrier to adjustably bias the lock surface against the handle.

2. A carrier for inserting and removing a memory storage device from a memory storage device rack, comprising:
   a handle attached to the carrier, the handle being removeable from a first position to second position where the handle extends from the carrier;
   a look mounted between the handle and the carrier to selectively lock the handle in the first position; and
   the lock includes a housing, a spring and a ball, a portion of the ball protrudes from the housing, the spring mounts within the housing to bias the protruding portion of the ball against the handle;
   wherein the housing has external threads to mate with the carrier, the housing rotates with the respect to the carrier to adjustably bias the ball against the handle.

3. A carrier for inserting and removing a memory storage device from a memory storage device rack, comprising:
   a handle attached to the carrier, the handle being removeable from a first position to second position where the handle extends from the carrier;
   a lock mounted between the handle and the carrier to selectively lock the handle in the first position; and
   the lock includes a housing, a spring and a ball, a portion of the ball protrudes from the housing, the spring mounts within the housing to bias the protruding portion of the ball against the handle;
   wherein the handle includes two ends, each end attaches to the carrier, the ends of the handle each include a lock plate with discrete recesses, the handle is rotatable between the first position where at least one of the discrete recesses engages the ball to lock the handle in the second position.

4. A carrier for inserting and removing a memory storage device from a memory storage device rack, comprising:
   a handle attached to the carrier, the handle being removeable from a first position to second position where the handle extends from the carrier;
   a lock mounted between the handle and the carrier to selectively lock the handle in the first position; and
   the lock includes a housing, a spring and a ball, a portion of the ball protrudes from the housing, the spring mounts within the housing to bias the protruding portion of the ball against the handle;
   wherein the handle includes two ends, each ends attaches to the carrier, at least one end of the handle includes a lock plate with discrete recesses that engage the ball to selectively lock the handle in either the first position or in the second position.

5. A carrier as set forth in claim 4, wherein the carrier has a face, the handle lies flush with the face in the first position.

* * * * *